(12) United States Patent
Reid

(10) Patent No.: US 8,858,301 B2
(45) Date of Patent: Oct. 14, 2014

(54) ATTACHMENT MECHANISM FOR A CUTTING DISC

(76) Inventor: Lachlan George Reid, Springdale (AU)

(*) Notice: Subject to any disclaimer, the term of this patent is extended or adjusted under 35 U.S.C. 154(b) by 1046 days.

(21) Appl. No.: 13/143,133

(22) PCT Filed: Jan. 6, 2009

(86) PCT No.: PCT/AU2009/000011
§ 371 (c)(1),
(2), (4) Date: Jul. 1, 2011

(87) PCT Pub. No.: WO2009/086594
PCT Pub. Date: Jul. 16, 2009

(65) Prior Publication Data
US 2011/0281508 A1    Nov. 17, 2011

(30) Foreign Application Priority Data
Jan. 7, 2008   (AU) .................. 2008900050

(51) Int. Cl.
| | | |
|---|---|---|
| B24B 23/02 | (2006.01) | |
| B24B 45/00 | (2006.01) | |
| B27B 5/32 | (2006.01) | |
| B27B 5/30 | (2006.01) | |
| B24B 27/08 | (2006.01) | |

(52) U.S. Cl.
CPC ... B27B 5/30 (2013.01); B27B 5/32 (2013.01); B24B 23/022 (2013.01); B24B 45/006 (2013.01); B24B 27/08 (2013.01)
USPC ............................ 451/359; 451/356; 403/259

(58) Field of Classification Search
USPC .......... 403/259, 261, 325; 451/344, 356, 357, 451/358, 359
See application file for complete search history.

(56) References Cited

U.S. PATENT DOCUMENTS

| | | | | |
|---|---|---|---|---|
| 2,369,297 A | * | 2/1945 | Johnson .................. | 411/106 |
| 2,789,402 A | * | 4/1957 | Tocci-Guilbert et al. ..... | 451/509 |
| 3,483,902 A | * | 12/1969 | Benz et al. ............... | 83/666 |
| 3,871,138 A | * | 3/1975 | Welsch ................... | 451/358 |
| 3,879,178 A | * | 4/1975 | Bosma .................... | 451/342 |
| 3,912,411 A | * | 10/1975 | Moffat .................... | 403/259 |
| 4,400,995 A | * | 8/1983 | Palm ...................... | 74/527 |
| 4,467,896 A | * | 8/1984 | Sauerwein et al. ......... | 188/69 |
| 4,489,525 A | * | 12/1984 | Heck ...................... | 451/344 |
| 4,572,047 A | * | 2/1986 | Punater et al. ............ | 83/481 |

(Continued)

*Primary Examiner* — Lee D Wilson
*Assistant Examiner* — Tyrone V Hall, Jr.
(74) *Attorney, Agent, or Firm* — Birch, Stewart, Kolasch & Birch, LLP

(57) ABSTRACT

Disclosed herein is a power tool (10) comprising a body (12), a rotatable drive shaft (14) having a free end (15) extending from the body (10), and a motor (16) for transmitting torque to the drive shaft (14). A cutting disc (24) having a mounting aperture (26) is engageable on the drive shaft (14). An attachment mechanism is provided for attaching the cutting disc (24) to the drive shaft (14). The attachment mechanism comprises a releasable locking member (30) associated with the drive shaft (14), the locking member (30) being movable between a locked configuration for retaining the cutting disc (24) on the drive shaft (14) and an unlocked configuration for releasing the cutting disc (24) for removal from the drive shaft (14). A biasing member (54) is associated with the locking member (30) for resiliently biasing the locking member toward the locked configuration. A release mechanism (56) is associated with the locking member (30) for moving the locking member into the unlocked configuration against the bias of the biasing member (54).

11 Claims, 5 Drawing Sheets

(56) References Cited

U.S. PATENT DOCUMENTS

| | | | | |
|---|---|---|---|---|
| 4,989,374 | A * | 2/1991 | Rudolf et al. | 451/342 |
| 5,022,188 | A * | 6/1991 | Borst | 451/342 |
| 5,058,909 | A * | 10/1991 | Rudolf et al. | 279/8 |
| 5,157,873 | A * | 10/1992 | Rudolf et al. | 451/342 |
| 5,601,483 | A * | 2/1997 | Rudolf et al. | 451/359 |
| 6,179,697 | B1 * | 1/2001 | Shibai | 451/359 |
| 6,202,760 | B1 * | 3/2001 | Lin | 173/109 |
| 6,238,155 | B1 * | 5/2001 | Aukzemas et al. | 411/107 |
| 6,485,360 | B1 * | 11/2002 | Hutchins | 451/357 |
| 6,569,001 | B2 * | 5/2003 | Rudolf et al. | 451/344 |
| 6,887,141 | B1 * | 5/2005 | Lin | 451/357 |
| 6,910,694 | B2 * | 6/2005 | Hartmann et al. | 279/141 |
| 7,344,435 | B2 * | 3/2008 | Pollak et al. | 451/342 |
| 8,182,316 | B2 * | 5/2012 | Peisert | 451/356 |
| 2002/0123301 | A1 * | 9/2002 | Chi | 451/344 |
| 2002/0170408 | A1 * | 11/2002 | Hartmann et al. | 83/666 |
| 2009/0145259 | A1 * | 6/2009 | Wall et al. | 74/527 |
| 2009/0156107 | A1 * | 6/2009 | Guenther et al. | 451/359 |
| 2009/0197514 | A1 * | 8/2009 | Peisert | 451/356 |

* cited by examiner

ATTACHMENT MECHANISM FOR A CUTTING DISC

FIELD

The present invention relates to an attachment mechanism for a cutting disc. The invention has been developed primarily for use in releasably retaining a rotatable cutting disc on a power tool, such as an angle grinder, circular saw or the like. However, it will be appreciated that the invention is not limited to this particular application and may also be used for retaining components in other devices.

BACKGROUND

Known angle grinders include a rotatable spindle on which a cutting disc is mounted. A locking nut is screwed onto a thread on the spindle using a specially configured tool to fasten the cutting disc to the spindle. The locking nut includes two apertures that are engageable by prongs on the tool for tightening or loosening adjustment of the nut.

A disadvantage of the known mounting arrangement for cutting discs is the significant time taken to unscrew the locking nut. A further disadvantage is that adjustment of the locking nut is difficult if the specially configured tool is misplaced. Yet a further disadvantage is that it is often necessary for the user to handle the cutting disc to stabilise the angle grinder when adjusting the locking nut.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided an attachment mechanism for a cutting disc of a power tool, the attachment mechanism comprising:

a rotatable drive shaft having a free end;

a releasable locking member associated with the drive shaft, the locking member being movable between a locked configuration for retaining a cutting disc on the drive shaft and an unlocked configuration for releasing the cutting disc for removal from the drive shaft;

a biasing member associated with the locking member for resiliently biasing the locking member toward the locked configuration; and a release mechanism associated with the locking member for moving the locking member into the unlocked configuration against the bias of the biasing member.

The locking member preferably includes a locking head of non-circular shape for selective alignment with and traversal through a similarly non-circularly shaped aperture in the cutting disc. In the locked configuration, the locking head is preferably misaligned with the aperture in the cutting disc, and in the unlocked configuration, the locking head is preferably aligned with the aperture in the cutting disc. In the locked configuration, the locking head and aperture are preferably rotationally misaligned. The locking member preferably includes a shaft extending from the locking head, the shaft being slidably engaged in a bore in the drive shaft. A limiting member is preferably provided for limiting axial movement of the locking member within the bore of the drive shaft. The limiting member is preferably fast with the locking member shaft and extends substantially radially outwardly therefrom for engagement with a substantially radially inwardly extending flange in the bore of the drive shaft. The limiting member preferably takes the form of a flange attached to, formed on, or welded to the shaft of the locking member. The drive shaft preferably includes a first substantially linear female spline. An actuating washer is preferably slidably engaged in the bore in the drive shaft. An outer periphery of the actuating washer preferably defines a first substantially linear male spline. The first male spline is preferably engageable with the first female spline in the drive shaft. The washer preferably includes a second, generally helical female spline. The locking member shaft preferably includes a second generally helical male spline. The second male spline of the locking member is preferably engageable with the second female spline of the actuating washer to facilitate the selective rotation of the locking member between the locked configuration and the unlocked configuration. An unlocking member is preferably engageable with the actuating washer to slide the actuating washer within the bore in the drive shaft, which in turn rotates the locking member. The unlocking member preferably includes a third substantially linear male spline for engagement with a third substantially linear female spline in a fixed component of the power tool. The third male spline is engageable with the first female spline in the drive shaft upon engagement of the unlocking member with the actuating washer to rotationally lock the drive shaft to the fixed component to prevent rotation of the cutting disc. A spring preferably extends between the limiting member and the actuating washer to bias the actuating washer away from the limiting member, which in turn biases the locking member toward the locked configuration.

In other embodiments, the locking head includes at least one retractable lug for selective engagement with a rim around the aperture in the cutting disc. In the locked configuration, the at least one lug is preferably extended and engaged with the rim, and in the unlocked configuration, the at least one lug is preferably retracted and disengaged from the aperture in the cutting disc.

In a second aspect, there is provided a power tool comprising:

a body;

a rotatable drive shaft having a free end extending from the body;

a motor for transmitting torque to the drive shaft;

a cutting disc having a mounting aperture for engagement on the drive shaft;

an attachment mechanism for attaching the cutting disc to the drive shaft, the attachment mechanism comprising:

a releasable locking member associated with the drive shaft, the locking member being movable between a locked configuration for retaining the cutting disc on the drive shaft and an unlocked configuration for releasing the cutting disc for removal from the drive shaft, a biasing member associated with the locking member for resiliently biasing the locking member toward the locked configuration, and a release mechanism associated with the locking member for moving the locking member into the unlocked configuration against the bias of the biasing member.

The locking member preferably includes a locking head of non-circular shape for selective alignment with and traversal through a similarly non-circularly shaped aperture in the cutting disc. In the locked configuration, the locking head is preferably misaligned with the aperture in the cutting disc, and in the unlocked configuration, the locking head is preferably aligned with the aperture in the cutting disc. In the locked configuration, the locking head and aperture are preferably rotationally misaligned. The locking member preferably includes a shaft extending from the locking head, the shaft being slidably engaged in a bore in the drive shaft. A limiting member is preferably provided for limiting axial movement of the locking member within the bore of the drive shaft. The limiting member is preferably fast with the locking member shaft and extends substantially radially outwardly therefrom for engagement with a substantially radially inwardly extending flange in the bore of the drive shaft. The limiting member preferably takes the form of a flange attached to, formed on, or welded to the shaft of the locking member. The drive shaft preferably includes a first substantially linear female spline. An actuating washer is preferably slidably engaged in the bore in the drive shaft. An outer periphery of the actuating washer preferably defines a first substantially linear male spline. The first male spline is preferably engageable with the first female spline in the drive shaft. The washer preferably includes a second generally helical female spline. The locking member shaft preferably includes a second generally helical male spline. The second male spline of the locking member is preferably engageable with the second female spline of the actuating washer to facilitate the selective rotation of the locking member between the locked configuration and the unlocked configuration. The release mechanism preferably comprises an unlocking member engageable with the actuating washer to slide the actuating washer within the bore in the drive shaft, which in turn rotates the locking member. The unlocking member preferably includes a third substantially linear male spline engaged with a third substantially linear female spline in a fixed component of the power tool. The third male spline is engageable with the first female spline in the drive shaft upon engagement of the unlocking member with the actuating washer to rotationally lock the drive shaft to the fixed component to prevent rotation of the cutting disc. A spring preferably extends between the limiting member and the actuating washer to bias the actuating washer away from the limiting member, which in turn biases the locking member toward the locked configuration.

In other embodiments, the locking head includes at least one retractable lug for selective engagement with a rim around the aperture in the cutting disc. In the locked configuration, the at least one lug is preferably extended and engaged with the rim, and in the unlocked configuration, the at least one lug is preferably retracted and disengaged from the aperture in the cutting disc.

A bevel gear is preferably attached to the drive shaft for engagement with a corresponding bevel drive gear connected to the motor. The axes of the bevel gears are preferably substantially at right angles to one another.

The aperture in the cutting disc preferably defines a keyway and the drive shaft preferably includes a corresponding key configuration engageable with the keyway to lock the cutting disc and the drive shaft against relative rotation. In other embodiments, the key configuration is provided on a component fast with the drive shaft. In still further embodiments, locking of the drive shaft and cutting disc together against relative rotation is provided by engagement of at least one projection on the drive shaft, or a component fast with the drive shaft, with at least one aperture on the cutting disc, or vice versa.

BRIEF DESCRIPTION OF THE DRAWINGS

A preferred embodiment will now be described, by way of example only, with reference to the accompanying drawings, in which.

DETAILED DESCRIPTION OF PREFERRED EMBODIMENTS

Figure 1:
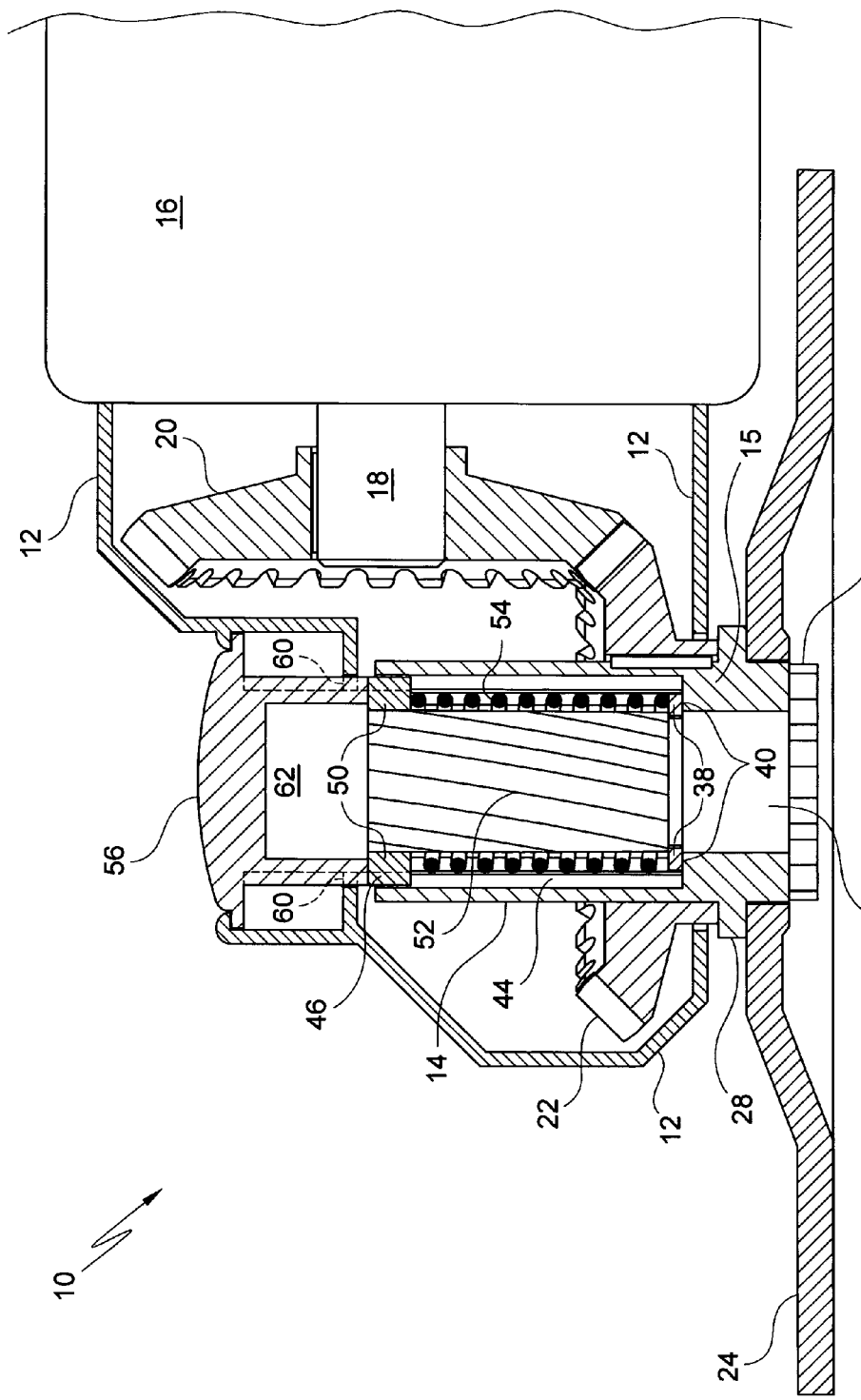
FIG. 1 is a schematic side view of an angle grinder including a preferred embodiment of an attachment mechanism for a cutting disc, in an operative configuration for use of the angle grinder.

Referring to the drawings, there is shown a power tool, in the form of an angle grinder 10, comprising a body 12 and a rotatable cutting disc drive shaft 14 having a free end 15 extending from the body 12. A motor 16 is housed in the body 12 for transmitting torque to the cutting disc drive shaft 14 via a main drive shaft 18, which rotates a first bevel gear 20 that engages a second bevel gear 22 rotationally fixed to the cutting disc drive shaft 14. The axis of the bevel gear 20 is substantially at right angles to the axis of the bevel gear 22. A cutting disc 24 having a mounting aperture 26 is engageable on the cutting disc drive shaft 14. A spacer 28 is fast with the drive shaft 14 and extends radially outwardly therefrom to space the cutting disc 24 at a predetermined distance away from the body 12 of the angle grinder.

Figure 4:
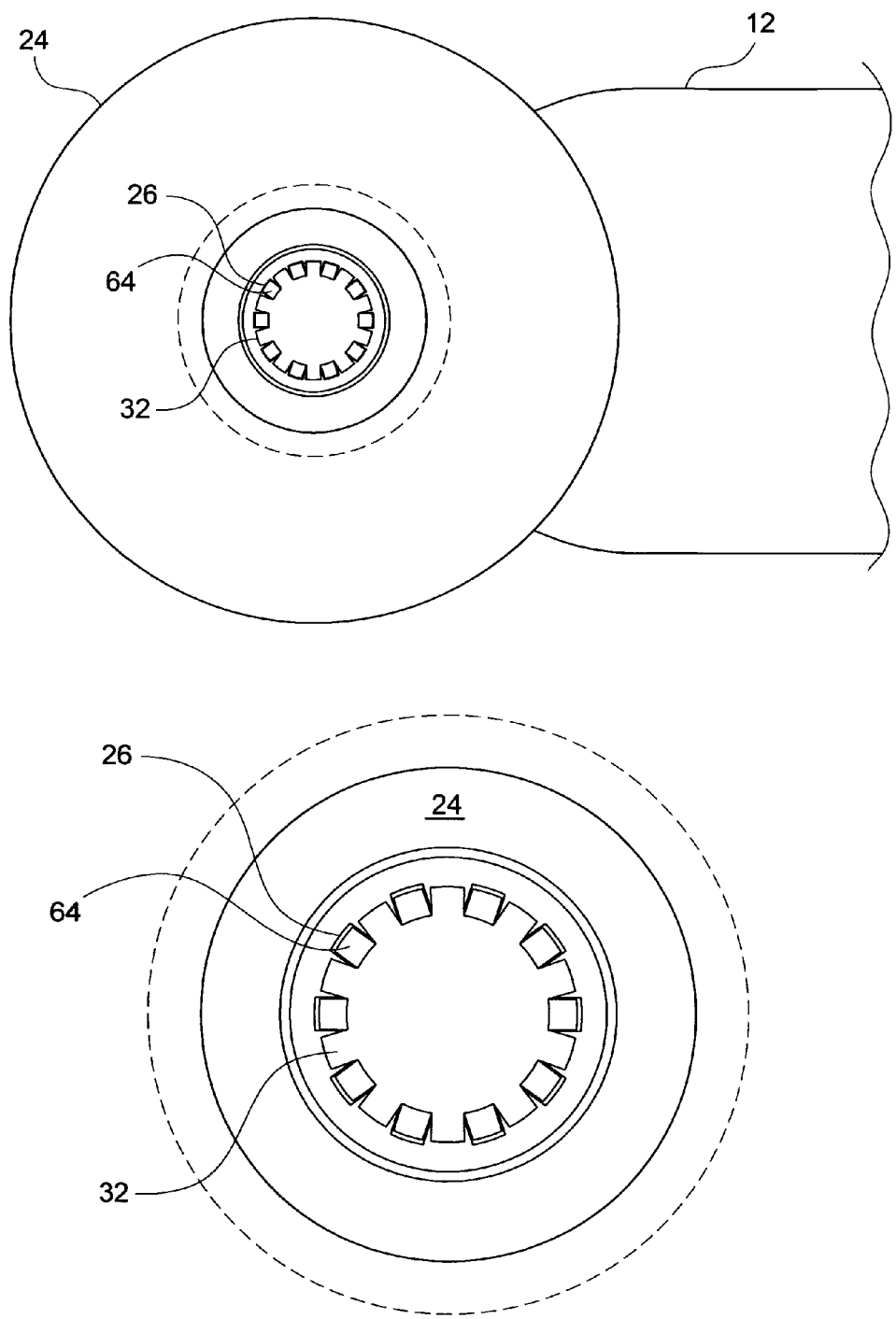
FIG. 4 is a schematic front view of the angle grinder of FIG. 1, showing the locking member in a locked configuration for operation of the angle grinder.
Figure 5:
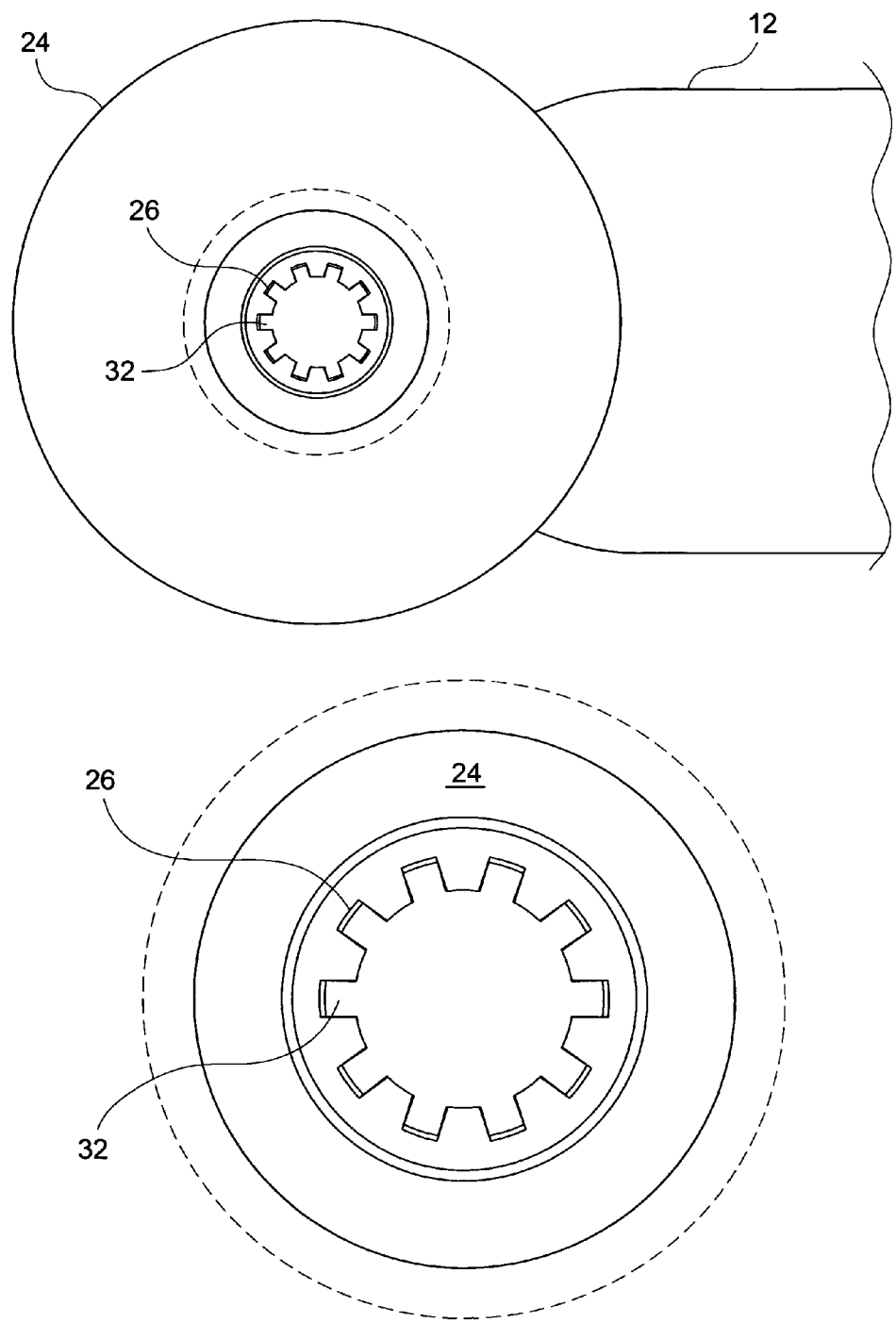
FIG. 5 is a schematic front view of the angle grinder of FIG. 1, showing the locking member in an unlocked configuration for changing a cutting disc.

An attachment mechanism is provided for attaching the cutting disc 24 to the cutting disc drive shaft 14. The attachment mechanism comprises a releasable locking member 30, having a head 32 and a shaft 34 extending from the head 32 and engaged within a bore 36 in the cutting disc drive shaft 14. The locking member 30 is movable between a locked configuration, as best seen in FIG. 4, for retaining the cutting disc 24 on the drive shaft 14 and an unlocked configuration, as best seen in FIG. 5, for releasing the cutting disc 24 for removal from the drive shaft 14. A limiting member, in the form of a washer 38 fast with the locking member shaft 34 and extending radially outwardly therefrom, is engageable with a radially inwardly directed flange 40 formed in the bore 36 of the drive shaft 14. Engagement of the washer 38 and flange 40 restrains axial movement of the locking member 30 in the bore 36.

As best seen in FIGS. 4 and 5, the locking member's head 32 is of non-circular shape for selective alignment with and traversal through the aperture 26 in the cutting disc 24, which is similarly non-circularly shaped. In the locked configuration of FIG. 4, the locking head 32 is rotationally misaligned with the aperture 26 so as to engage the outer surface of the cutting disc 24 and retain the cutting disc on the drive shaft 14. In the unlocked configuration of FIG. 5, the locking head 32 is aligned with the aperture 26 to allow the locking head 32 to be retracted out of engagement with the cutting disc 24, thereby disengaging the cutting disc from the drive shaft 14.

Figure 2:
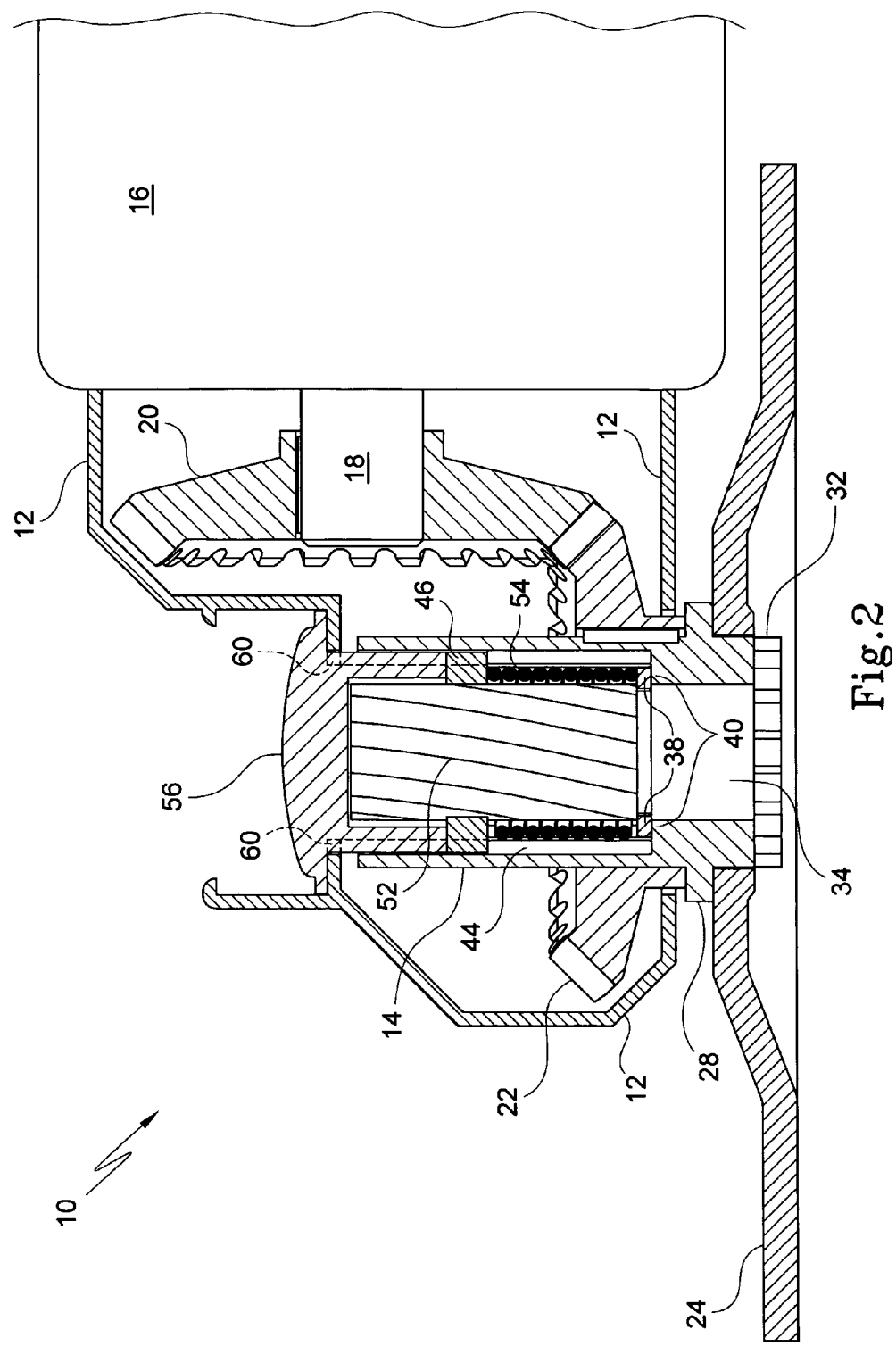
FIG. 2 is a schematic side view of the angle grinder of FIG. 1, in an inoperative configuration for changing a cutting.
Figure 3:
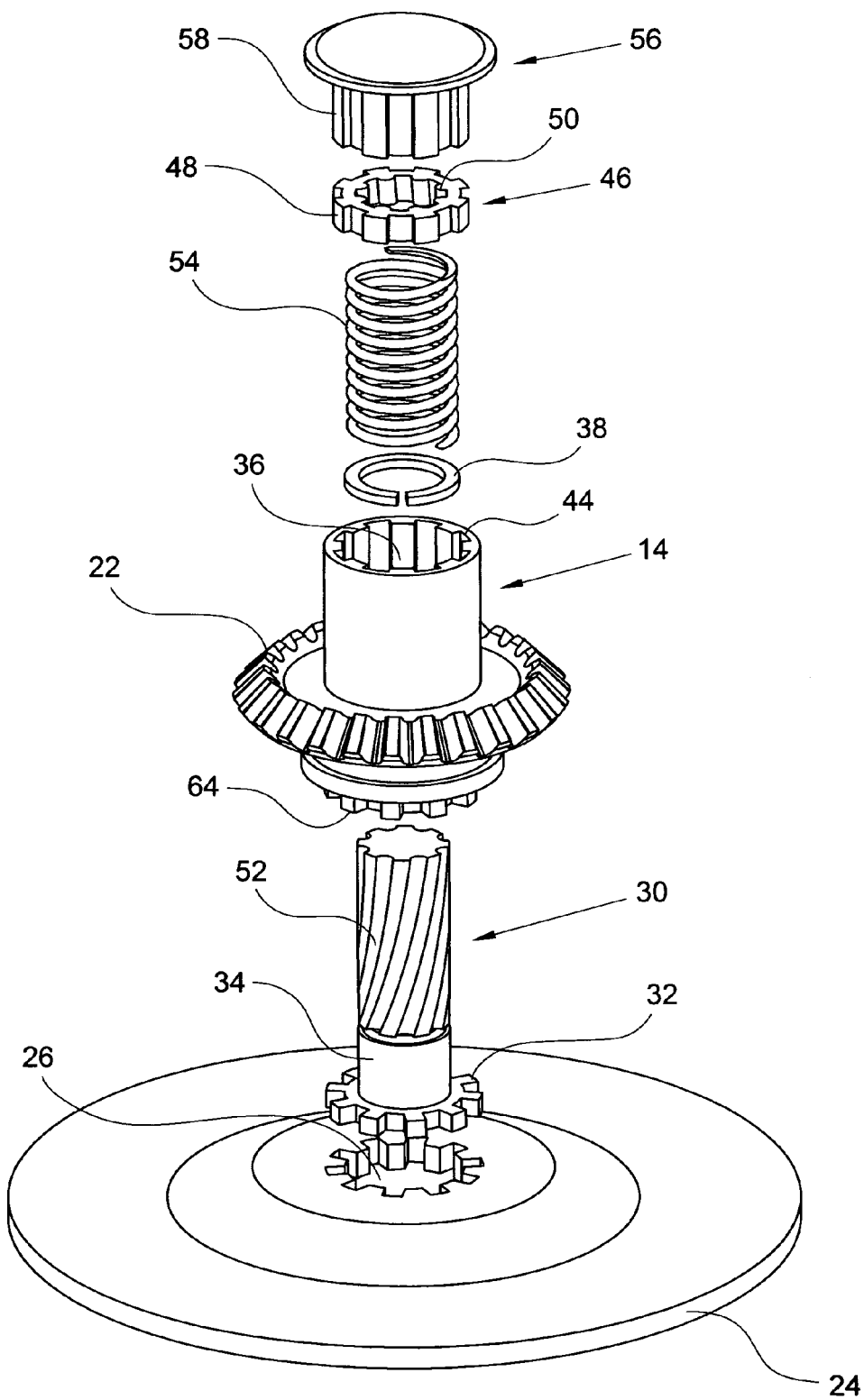
FIG. 3 is an exploded schematic perspective view of the attachment mechanism of the angle grinder of FIG. 1.

Referring to FIGS. 1-3, the drive shaft 14 includes a first substantially linear female spline 44. An actuating washer 46 is slidably engaged in the bore 36 in the drive shaft 14. The washer 46 has an outer periphery defining a first substantially linear male spline 48 engageable with the first female spline 44 in the drive shaft 14. The washer 46 also includes a second generally helical female spline 50. The locking member shaft 34 includes a second generally helical male spline 52 engageable with the second female spline 50 of the actuating washer 46 to facilitate the selective rotation of the locking member 30 between the locked configuration of FIGS. 1 and 4 and the unlocked configuration of FIGS. 2 and 5.

A biasing member, in the form of a spring 54, extends between the washer 38 fixed to the locking member 30 and the actuating washer 46 to bias the actuating washer away from the washer 38, which in turn biases the locking member 30 toward the locked configuration of FIGS. 1 and 4.

A release mechanism, comprising an unlocking button 56, is engageable with the actuating washer 46 to slide the actuating washer 46 within the bore 36 in the drive shaft 14, between the positions shown in FIGS. 1 and 2. This movement of the actuating washer 46 in turn rotates the locking member 30 from the locked configuration of FIGS. 1 and 4 to the unlocked configuration of FIGS. 2 and 5 by virtue of the interaction of the helical male spline 52 and helical female spline 50. The unlocking button 56 includes a third substantially linear male spline 58 engaged with a third substantially linear female spline 60 formed in the angle grinder body 12. As best seen in FIG. 3, the third male spline 58 is also engageable with the first female spline 44 in the drive shaft 14 upon depressing the button 56. The unlocking button 56 also includes a bore 62 of larger diameter than the locking member shaft 34 and into which the shaft 34 extends when the button 56 is depressed, as best seen in FIG. 2. Accordingly, depression of the unlocking button 56 engages the drive shaft 14 with the body 12, via the unlocking button 56, to rotationally lock the drive shaft 14 and prevent rotation of the cutting disc 24. This locking of the drive shaft 14 facilitates preventing inadvertent actuation of the drive shaft 14 when changing a cutting disc 24.

The non-circular aperture 26 in the cutting disc 24 also defines a keyway that is engageable by a correspondingly shaped key configuration on the outer surface of the drive shaft 14 to lock the cutting disc 24 and the drive shaft 14 against relative rotation. In the illustrated embodiment, the key configuration on the outer surface of the drive shaft 14 takes the form of a substantially linear male spline 64 and the non circular aperture 26 in the cutting disc 24 is shaped accordingly.

In use, to change a cutting disc 24, the unlocking button 56 is pressed. Pressing the unlocking button 56 causes the actuating washer 46 to slide axially within the bore 36 of the drive shaft 14 from the position shown in FIG. 1 to the position shown in FIG. 2. During this axial movement, the actuating washer 46 and drive shaft 14 do not rotate, due to engagement of the substantially linear male spline 58 on the unlocking button 56 with the fixed spline 60 and the female spline 44 on the drive shaft 14. However, the locking member 30 is free to rotate relative to the drive shaft 14, and does so due to the interaction of the generally helical female spline 50 on the actuating washer 46 with the generally helical male spline 52 on the locking member shaft 34. With the locking member 30 rotated, as best seen in FIG. 5, the head 32 of the locking member 30 is aligned with the aperture 26 in the cutting disc 24. Accordingly, simply turning the angle grinder 10 such that the cutting disc 24 faces the ground causes the cutting disc 24 to disengage from the drive shaft 14 under the influence of gravity. With the unlocking button 56 depressed, a new cutting disc 24 can be slid over the head 32 of the locking member 30 to engage the non-circular aperture 26 of the cutting disc with the male spline 64 of the drive shaft 14. When the non-circular aperture 26 and male spline 64 of the drive shaft 14 are engaged, the unlocking button 56 is released and the spring 54 biases the actuating washer 46 away from the washer 38, which causes the locking member 30 to rotate such that the head 32 is again misaligned with the aperture 26 in the new cutting disc 24 to retain same in engagement with the drive shaft 14.

It will be appreciated that the above described power tool 10, and cutting disc attachment mechanism therefor, provide significant benefits over known power tools. For example, the release mechanism for the power tool 10 described and illustrated is relatively simple to operate and allows for relative quick changing of cutting discs 24, without the use of tools. Also, it is not necessary for a user to handle the installed cutting disc 24 during its removal from the drive shaft 14. Moreover, the amount of handling of a new cutting disc 24 during its installation on the drive shaft 14 is reduced compared to that required in known power tools.

It will also be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive. Examples of possible variations and/or modifications include, but are not limited to:

- the key configuration for locking the cutting disc 24 and drive shaft 14 against relative rotation being provided on the spacer 28;
- locking the drive shaft and cutting disc together against relative rotation by engagement of at least one projection on the spacer 28, or another component fast with the drive shaft 14, with at least one aperture on the cutting disc, or vice versa; and/or
- the locking head 32 including at least one retractable lug for selective engagement with a rim around the aperture 26 in the cutting disc 24, wherein, in the locked configuration, the at least one lug is extended and engaged with the rim, and in the unlocked configuration, the at least one lug is retracted and disengaged from the rim;
- the limiting member 38 taking the form of a projection formed on, welded to, or attached by one or more mechanical fasteners to the locking member 30;
- the radially inwardly directed flange 40 being welded or attached by one or more mechanical fasteners to the drive shaft 14; and/or
- the various male linear splines can take the form of polygonal shafts and the female linear splines can take the form of corresponding polygonal bores.

The invention claimed is:

1. An attachment mechanism for a cutting disc of a power tool, the attachment mechanism comprising:
    a rotatable drive shaft having a free end;
    a releasable locking member associated with the drive shaft, the locking member being movable between a locked configuration for retaining a cutting disc on the drive shaft and an unlocked configuration for releasing the cutting disc for removal from the drive shaft;
    a biasing member associated with the locking member for resiliently biasing the locking member toward the locked configuration; and a release mechanism associated with the locking member for moving the locking member into the unlocked configuration against the bias of the biasing member;

wherein the locking member comprises a locking head of non-circular shape for selective alignment with and traversal through a similarly non-circularly shaped aperture in the cutting disc; and the locking member comprises a shaft extending from the locking head, the shaft being slidably engaged in a bore in the drive shaft; and further comprising a limiting member for limiting axial movement of the locking member within the bore of the drive shaft.

2. The attachment mechanism of claim 1, wherein, in the locked configuration, the locking head is misaligned with the aperture in the cutting disc, and in the unlocked configuration, the locking head is aligned with the aperture in the cutting disc.

3. The attachment mechanism of claim 2, wherein, in the locked configuration, the locking head and aperture are rotationally misaligned.

4. The attachment mechanism of claim 1, wherein the limiting member is fixedly connected to the locking member shaft and extends substantially radially outwardly therefrom for engagement with a substantially radially inwardly extending flange in the bore of the drive shaft.

5. The attachment mechanism of claim 4, wherein the drive shaft includes a first substantially linear female spline.

6. The attachment mechanism of claim 5, further comprising an actuating washer slidably engaged in the bore in the drive shaft, an outer periphery of the actuating washer defining a first substantially linear male spline engageable with the first female spline in the drive shaft.

7. The attachment mechanism of claim 6, wherein the actuating washer comprises a second generally helical female spline and the locking member shaft comprises a second generally helical male spline engageable with the second female spline of the actuating washer to facilitate the selective rotation of the locking member between the locked configuration and the unlocked configuration.

8. The attachment mechanism of claim 6, further comprising an unlocking member engageable with the actuating washer to slide the actuating washer within the bore in the drive shaft, which in turn rotates the locking member.

9. The attachment mechanism of claim 6, further comprising a spring extending between the limiting member and the actuating washer to bias the actuating washer away from the limiting member, which in turn biases the locking member toward the locked configuration.

10. A power tool comprising:
a body;
a rotatable drive shaft having a free end extending from the body;
a motor for transmitting torque to the drive shaft;
a cutting disc having a mounting aperture for engagement on the drive shaft; and
an attachment mechanism for attaching the cutting disc to the drive shaft, the attachment mechanism comprising:
a rotatable drive shaft having a free end,
a releasable locking member associated with the drive shaft, the locking member being movable between a locked configuration for retaining a cutting disc on the drive shaft and an unlocked configuration for releasing the cutting disc for removal from the drive shaft,
a biasing member associated with the locking member for resiliently biasing the locking member toward the locked configuration, and
a release mechanism associated with the locking member for moving the locking member into the unlocked configuration against the bias of the biasing member,
wherein the locking member comprises a locking head of non-circular shape for selective alignment with and traversal through a similarly non-circularly shaped aperture in the cutting disc, and
the locking member comprises a shaft extending from the locking head, the shaft being slidably engaged in a bore in the drive shaft, and
further comprising a limiting member for limiting axial movement of the locking member within the bore of the drive shaft.

11. The power tool of claim 10, further comprising a bevel gear attached to the drive shaft for engagement with a corresponding bevel drive gear connected to the motor.

* * * * *